(No Model.) 2 Sheets—Sheet 2.

M. R. MARTIN.
WINDMILL.

No. 462,949. Patented Nov. 10, 1891.

Witnesses
W. T. Keene
F. L. Middleton

Inventor
M. R. Martin
by Ellis Spear
Atty.

UNITED STATES PATENT OFFICE.

MYRON R. MARTIN, OF HUMBOLDT, IOWA.

WINDMILL.

SPECIFICATION forming part of Letters Patent No. 462,949, dated November 10, 1891.

Application filed March 9, 1891. Serial No. 384,266. (No model.)

*To all whom it may concern:*

Be it known that I, MYRON R. MARTIN, a citizen of the United States of America, residing at Humboldt, in the county of Humboldt and State of Iowa, have invented certain new and useful Improvements in Windmills, of which the following is a specification.

My invention relates to windmills, and embraces as its broad feature the hinging of the vane and wheel together or the pivoting or swiveling of the vane and wheel support, to have separate pivotal movement, and connecting the vane-bracket by a geared connection with the intermediate gearing between the vertical shaft in the tower and the driven shaft, by which the tendency of the wheel to swivel out of the wind under a heavy load or variations in the wind will be transmitted to the vane, which will react through the connections and properly control the position of the wheel. The hinging of the vane and wheel allows the wheel to face the wind squarely under normal conditions or turn edgewise to the wind as the force of the wind increases. Beside this broad feature the invention consists of an improved gearing adapted to this and to other windmills.

Figure 1:
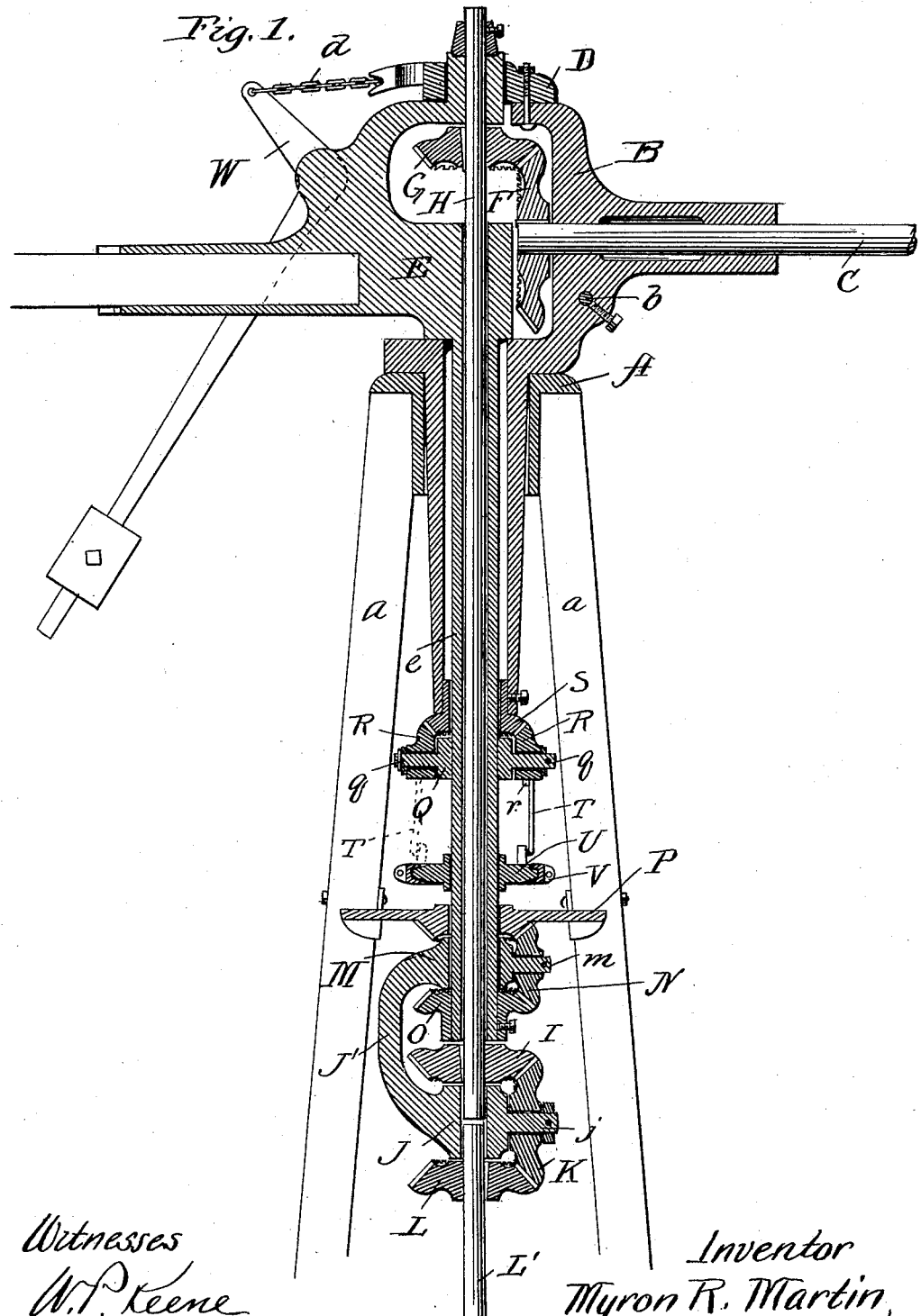
Figure 2:
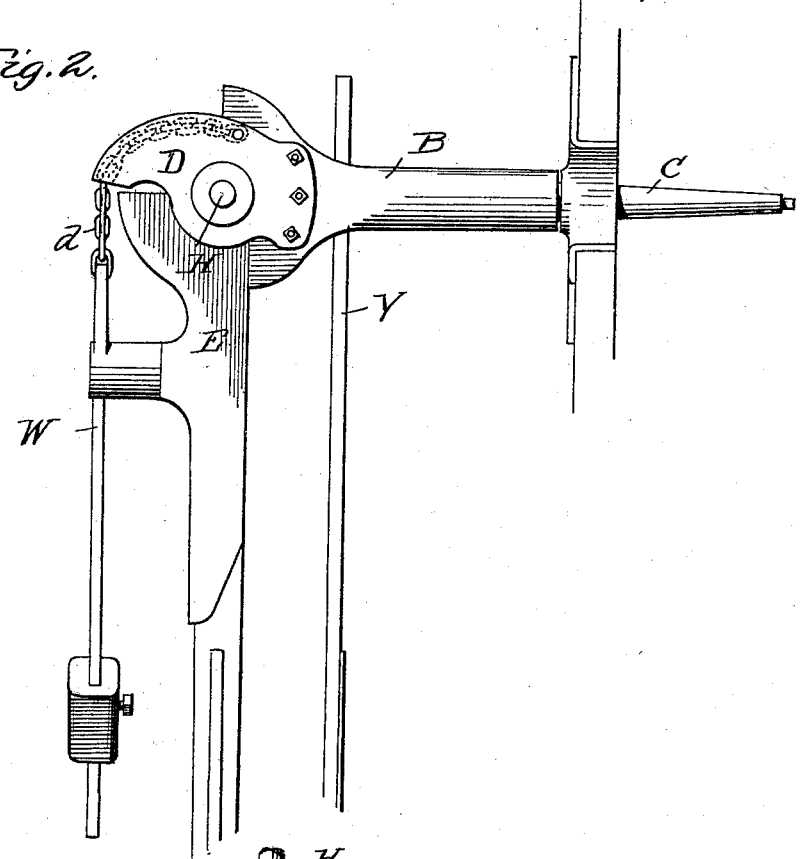
Figure 3:
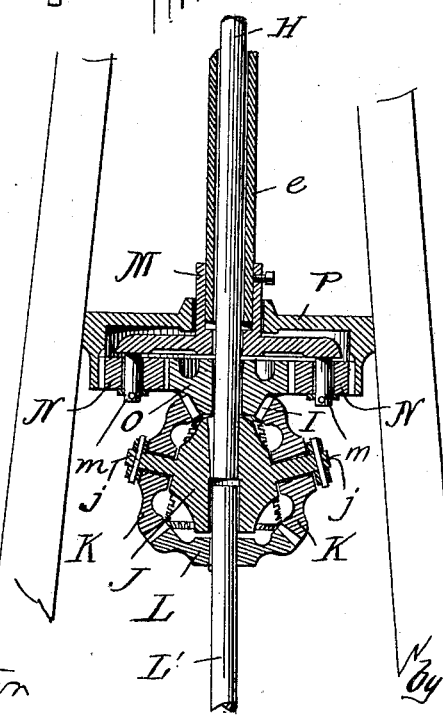

In the drawings, Figure 1 is a vertical sectional view of the mill and gearing in the position for the wheel to receive the wind. Fig. 2 is a plan view with the wheel out of position to receive the wind. Fig. 3 is a vertical sectional view of a modification.

In Fig. 1, A is the tower-casting provided with a circular sleeve at the upper ends of the tower-posts $a\ a$, on which the wind-wheel bracket B is located. This has a pivotal sleeve projecting down through the tower-casting A, and has a horizontal bearing in which the wind-wheel shaft C is journaled. The side vane Y (shown in Fig. 2) is carried by the wheel-bracket B, and is held in place with a set-screw at $b$. The casting D is bolted to the wheel-bracket B at its upper end in which the vane-bracket E is journaled, and is provided with a grooved regulating-arc in which one end of the chain $d$ is secured, and the other end of the chain is attached to the weighted lever W, which is loosely mounted on a fixed bearing in the vane-bracket E. This bracket supports and carries the main vane or rudder, which steers the wind-wheel to the wind, and it is provided with the tube $e$, which passes down through the wind-wheel pivotal sleeve, and is centrally supported by the casting P, hereinafter to be described.

The brackets B and E have suitable shoulders, which limit the travel of the wind-wheel out of and into the action of the wind, as shown in Fig. 2. The wind-wheel shaft C has fixed on its inner end the driving-gear F, which engages the gear G, keyed to the vertical shaft H, which is journaled in the casting E. The shaft H passes through the tube $e$, and has the gear I keyed thereto near its lower end. The shaft terminates in the hub J, which has an arm $j$, on which the gear K is loosely mounted. This gear engages with the gear I and the gear L on opposite sides. The gear L is keyed to the driven shaft L', which projects into the hub J, and connects with driven machinery. The hub J has a rigid connection J', with a similar hub M, loosely mounted on the tube $e$, and this hub is provided with an arm $m$, on which is mounted the gear N, engaging with the gear O, fixed to the tube $e$ of the vane-bracket. The gear N also meshes into the stationary gear P, before spoken of, which is provided with a flange and suitable lugs to secure it to the tower-posts $a\ a$. This constitutes the balanced geared connection between the pivoted vane and the vertical connections in the tower. To shift the mill by hand out of and into action of the wind, the collar Q is secured to the tube $e$, and is provided with oppositely-arranged arms $q\ q$, on which the segmental pinions R R are loosely mounted, which engage with corresponding toothed sections fixed on the bushing S, located between the tube $e$ and the sleeve of the wheel-bracket B at its lower end and rigidly fixed to the said sleeve, forming a bearing for the same upon the tube $e$ of the vane-pivot E. The rods T T connect the arms $r$ of the segmental pinion R R with the inside part of the swivel-ring U, which is loosely mounted upon the tube $e$. The ring is thus permitted vertical movement and may turn around with tube e and inside of the outer part of the swivel-ring V, which is provided with holes on opposite sides to attach suitable rods or wires to pull the mill out of the action of the wind, and the weighted lever is to pull it into the wind and exert a certain force to hold it there. This may be accomplished by any other convenient weight or spring, or the chain may extend to the main vane or rudder, and that suitably hinged to raise and lower to give the desired effect. When the pressure of the wind on the side vane is sufficient to raise the weight, then the wind-wheel begins to turn out of the wind, and when the wind subsides the weight pulls it into the wind. Thus is its mode of governing. The action of the driving-gear F, when revolved in the proper direction, has a tendency to climb around gear G, termed "side draft," which holds the wind-wheel shaft in line with the main vane and exerts the amount of force according to the amount of work being done in addition to that of the weighted lever W. The velocity of wind required upon the side vane to turn the wind-wheel out of the wind depends upon the amount of work the mill is doing. Therefore the side draft is made good use of to hold the wind-wheel into the wind according to the amount of work being done, and the main vane being reacted upon prevents the wind-wheel from running out of or past the line of the wind. The gear I, being turned by the shaft H, turns the gear L on the driven shaft L' through the intermediate gear K, which, being loosely mounted on the arm of the hub J, tends to revolve the two hubs J and M, these being rigidly connected, and the gear N, being mounted on the hub M, reacts on the gear P, fixed to the stationary tower, and the gear O, attached to the main vane by means of the tube e. When the vane swings with the changes of the wind, it carries with it the shaft H and gears O and I. They cause the gears N and K to revolve on the gears L and P, thus not moving the driven shaft L', which permits the mill to swivel freely with the wind.

In Fig. 3 is shown another gearing as applied to my present invention, similar to that which is shown in patent No. 267,440 granted to me November 14, 1882, except the driving-gear on the windmill-shaft and the gear driven thereby, and those here shown in Fig. 1, F and G, take their places. The internal gear P is fixed to casting supporting the tower-posts. The hub M is secured to said tube e and carries the arms m m, on which is loosely mounted the gears N N. They engage with the internal gear P on one side and the gear O on the other side, which is loosely mounted on the central shaft H, and has another set of teeth, termed "gear" I, in which the gears K K engage, being loosely mounted on the arms j j of the hub J, which is keyed to the said shaft H. The gears K K engage on their opposite sides from the gear I with the gear L, fitted to the driven shaft L'. When the shaft H revolves, it carries the hub J and the gears K K, which roll on the gear I and on their axis, thus imparting motion to the gear L. When the tube e turns with the vane, it carries the hub M and the gears N N. They roll in the gear P and impart motion to the gears O and I. The gear I rolls the gears K K on the gear L, thus carrying the hub J and shaft H with the tube e.

It is evident other modifications of gearing may be used to give the desired result without departing from my invention. It will be obvious, also, that other means may be provided for turning the wheel out of the wind by hand-connections, which may extend above the tower and be operated by a lever, dispensing with the segmental pinions R R.

I claim as my invention—

1. In combination, the vane-bracket, the wind-wheel bracket, the wind-wheel shaft and its gear F, the parts driven by said gear consisting of the shaft H and its gear G, the gear I, the shaft L', and the intermediate gearing between the gear I and the shaft L', connecting the same, and connections between said gearing and the vane-bracket, substantially as described.

2. In combination, the vane-bracket, the wind-wheel bracket, the wheel-shaft, and the shaft H, geared together, the shaft L', the intermediate gearing between said shafts, and geared connections from said intermediate gearing to the vane-bracket, said wheel-bracket and vane-bracket being separately pivoted and hinged together, substantially as described.

3. In combination, the stationary tower, the wheel-bracket pivoted thereon and carrying the wheel-shaft, the pivoted vane-bracket, the shaft H, driven by the wheel-shaft, the shaft L', the intermediate gearing between the shaft H and the shaft L', said intermediate gearing being geared to the vane-bracket and the stationary tower, substantially as described.

4. In combination with the tower of a windmill, a bracket for the wheel pivoted upon said tower, a shaft, as H, driven by the wheel-shaft, a bracket for the vane pivoted independently of the wheel-bracket, and interposed gearing between the vane-bracket and the shaft H, substantially as described.

5. In combination with the shaft H, and the gears F and G, imparting movement thereto, the gear I on said shaft, the gear L on the driven shaft, and a part J', carrying gears K and N, said gears being interposed, respectively, between the gears on the shaft H and the driven shaft and between a stationary gear and the gear of the vane-bracket, substantially as described.

6. In combination, the wheel-bracket carrying the wind-wheel and its shaft, the vane-bracket, the governing-weight, and side vane for regulating the speed of the wind-wheel, the shaft H, driven by the wind-wheel shaft through gears F and G, the intermediate gearing between the shaft H and the shaft L', said intermediate gearing being geared to the vane-bracket, whereby the power of the wind-wheel being transmitted through the gears F and G tends to hold the wind-wheel in line with the wind, substantially as described.

In testimony whereof I affix my signature in presence of two witnesses.

MYRON R. MARTIN.

Witnesses:
WM. J. TAFT,
O. D. MARTIN.